United States Patent
Zaslavsky

(10) Patent No.: US 11,537,418 B2
(45) Date of Patent: *Dec. 27, 2022

(54) SIMULATED CHANGE OF IMMUTABLE OBJECTS DURING EXECUTION RUNTIME

(71) Applicant: Morgan Stanley Services Group Inc., New York, NY (US)

(72) Inventor: Dmitry Zaslavsky, Edison, NJ (US)

(73) Assignee: Morgan Stanley Services Group Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/212,613

(22) Filed: Mar. 25, 2021

(65) Prior Publication Data

US 2021/0208912 A1  Jul. 8, 2021

Related U.S. Application Data

(63) Continuation of application No. 16/406,240, filed on May 8, 2019, now Pat. No. 10,990,425.

(51) Int. Cl.
*G06F 9/455* (2018.01)
*G06F 8/34* (2018.01)
(Continued)

(52) U.S. Cl.
CPC ............ *G06F 9/45508* (2013.01); *G06F 8/34* (2013.01); *G06F 8/41* (2013.01); *G06F 9/44526* (2013.01); *G06F 9/45533* (2013.01)

(58) Field of Classification Search
CPC ............................... G06F 9/45508; G06F 8/34
(Continued)

(56) References Cited

U.S. PATENT DOCUMENTS 6,957,422 B2 * 10/2005 Hunt .................. H04L 41/0233
  717/172
7,861,217 B2 * 12/2010 Ciolfi ..................... G06F 30/20
  717/109

(Continued)

OTHER PUBLICATIONS

Zibin, Yoav, et al. "Object and reference immutability using Java generics." Proceedings of the the 6th joint meeting of the European software engineering conference and the ACM SIGSOFT symposium on the foundations of software engineering. 2007. pp. 75-84 (Year: 2007).*

(Continued)

*Primary Examiner* — Satish Rampuria
(74) *Attorney, Agent, or Firm* — Weitzman Law Offices, LLC

(57) ABSTRACT

A system for executing software, wherein a computing device stores instructions for a code execution module such that, when the instructions are executed, the computing device will: receive, for execution by the code execution module, software; create one or more immutable software nodes described in the software; determine that the software comprise an instruction to begin a simulated change at runtime of the one or more immutable software nodes; store the simulated change in a simulated change apparatus; using the simulated change apparatus, perform one or more operations of the software as if the one or more immutable software nodes had been changed in memory, during a period of time where each of the one or more immutable software nodes is guaranteed to retain logical immutability; and output results of the one or more operations.

20 Claims, 5 Drawing Sheets

(51) Int. Cl.
*G06F 9/445* (2018.01)
*G06F 8/41* (2018.01)

(58) Field of Classification Search
USPC .................................. 717/106–109, 120–135
See application file for complete search history.

(56) References Cited

U.S. PATENT DOCUMENTS

| | | | | |
|---|---|---|---|---|
| 8,423,975 | B1 | 4/2013 | Scallon | |
| 8,887,286 | B2* | 11/2014 | Dupont | G06F 21/50 |
| | | | | 726/25 |
| 8,954,870 | B2* | 2/2015 | Martin | G06F 9/451 |
| | | | | 715/966 |
| 9,098,269 | B2 | 8/2015 | Duffy | |
| 10,268,567 | B2* | 4/2019 | Marron | G06F 11/3628 |
| 2004/0111252 | A1* | 6/2004 | Burgun | G06F 30/331 |
| | | | | 703/28 |
| 2006/0036426 | A1* | 2/2006 | Barr | G06F 30/20 |
| | | | | 703/22 |
| 2010/0198799 | A1 | 8/2010 | Krishnan | |
| 2015/0309772 | A1* | 10/2015 | Duggal | G06F 8/35 |
| | | | | 717/104 |
| 2016/0294614 | A1* | 10/2016 | Searle | H04L 67/34 |

OTHER PUBLICATIONS

Zibin, Yoav, et al. "Ownership and immutability in generic Java." ACM Sigplan Notices 45.10 (2010): pp. 598-617. (Year: 2010).*
Gordon, Colin S., et al. "Uniqueness and reference immutability for safe parallelism." ACM SIGPLAN Notices 47.10 (2012): pp. 21-40. (Year: 2012).*
Dwyer, Matthew B., and John Hatcliff. "Bogor: an extensible and highly-modular software model checking framework." ACM SIGSOFT Software Engineering Notes 28.5 (2003): pp. 267-276. (Year: 2003).*
Szyperski, Clemens. "Component technology—what, where, and how?." 25th International Conference on Software Engineering, 2003. Proceedings.. IEEE, 2003.pp. 684-693 (Year: 2003).*
Costan, Victor, et al. "The trusted execution module: Commodity general-purpose trusted computing." International Conference on Smart Card Research and Advanced Applications. Springer, Berlin, Heidelberg, 2008.pp. 133-148 (Year: 2008).*

* cited by examiner

| 250a | 250b |
|---|---|
| a.value | -7 |
| b.getAbs() | 3 |
| Number.getAbs | function {return value * 2;} |

250

| 255a | 255c | 255b |
|---|---|---|
| totalSum() | a.getValue(), b.getValue(), c.getValue() | 30 |
| a.getValue() | a | 10 |
| b.getValue() | b | 10 |
| c.getValue() | c | 10 |
| a | null | (object having a 10 in value field) |
| b | null | (object having a 10 in value field) |
| c | null | (object having a 10 in value field) |

255

260

SIMULATED CHANGE OF IMMUTABLE OBJECTS DURING EXECUTION RUNTIME

CROSS REFERENCE TO RELATED APPLICATIONS

This application is a continuation of and claims priority to U.S. patent application Ser. No. 16/406,240, filed May 8, 2019 and also titled "SIMULATED CHANGE OF IMMUTABLE OBJECTS DURING EXECUTION RUNTIME," which is hereby incorporated by reference in its entirety.

FIELD OF INVENTION

This application relates to software for executing code on a computing device, and more specifically, an environment that enables efficiently managing data structures while considering hypothetical program states that do not change underlying stored immutable objects.

BACKGROUND

When a computer programmer writes source code in a high-level programming language, the code must, either before or during execution, be transformed from an almost-English set of instructions into a form that is intelligible to a computer processor as a series of discrete instructions at the machine level. For some languages, usually termed "interpreted languages" or "scripting languages," the source code is loaded directly into a computer program called an interpreter that generates the machine instructions at runtime, which can result in much slower execution as the processor waits for commands from the interpreter. For other languages, usually termed "compiled languages," a computer program called a compiler generates the machine language that will be needed for a particular processor type and possibly operating system (OS), allowing for faster execution but generating a compiled program that may not be compatible with other processor types or OSs.

A few programming languages such as Java™ have been designed with a hybrid approach in mind. High-level source code is compiled into an intermediate "bytecode" that is optimized for speed and efficiency in comparison to the source code, and is the same for all processor and operating system types, but is not intended to be directly intelligible by any processor. Then, an interpreter (for example, the Java Virtual Machine™) that is configured for a particular processor and OS receives bytecode and generates the proper machine instructions for the processor with less overhead processing than a scripting interpreter. As a result, speed of execution is balanced with cross-platform compatibility of a single distributable compiled version of bytecode.

One feature of many programming languages is that variables which are not "primitives" (for example, an integer or a boolean value) and instead are more complicated Objects, such as a String or HashTable, are not directly changed in memory when a program instruction attempts to change the object reference. Instead, the reference to the Object is redirected to a newly created Object, and the older Object remains in memory, or may be subsequently removed by an automated "garbage collector" or a manual command to free a region of memory for later use. Thus, for example, code reading "String s="hello"; s="goodbye"; s="hello again"" would actually create at least three new Objects in memory, despite the variable s only pointing to the memory address storing the last of the three. This problem is further compounded when Objects contain references to other Objects, so that a change in one reference causes a cascading chain of newly created Objects, or in multi-threaded applications, where changes in Objects may need to be propagated into other concurrently-executed processes than the process originally making the change to one or more objects. As a result, software often either needs to be written with extra care or complexity to minimize the numbers of newly created objects at runtime, or else suffer unnecessarily decreased performance during runtime.

SUMMARY OF THE INVENTION

A system for executing software is disclosed, comprising a computing device comprising at least one processor and non-transitory memory storing instructions for a code execution module. When the instructions are executed by the at least one processor, the at least one processor will: receive, for execution by the code execution module, software; create one or more immutable software nodes described in the software; determine that the software comprise an instruction to begin a simulated change at runtime of the one or more immutable software nodes; store the simulated change in a simulated change apparatus; using the simulated change apparatus, perform one or more operations of the software as if the one or more immutable software nodes had been changed in memory, during a period of time where each of the one or more immutable software nodes is guaranteed to retain logical immutability; and output results of the one or more operations.

A method of simulating change of immutable elements during runtime of a software executable is also disclosed, comprising: receiving, for execution by a code execution module, software; creating one or more immutable software nodes described in the software; automatically determining that the software comprise an instruction to begin a simulated change at runtime of the one or more immutable software nodes; storing the simulated change in a simulated change apparatus; using the simulated change apparatus, performing one or more operations of the software as if the one or more immutable software nodes had been changed in a non-transitory memory, during a period of time where each of the one or more immutable software nodes is guaranteed to retain logical immutability; and outputting results of the one or more operations.

DETAILED DESCRIPTION

In response to the difficulties of managing desired changes to software objects at runtime, an infrastructure may be created to manage a number of developer-defined "tweaks," or changes to "nodes," (which may include objects, variables/data fields, and functions) that do not disturb or recreate existing underlying objects in the heap used by a virtual machine.

The infrastructure can be made language- and platform-agnostic through the use of a modified source code editor, code compiler, executing virtual machine, executing interpreter, or other entity of the software development and execution pipeline, allowing operations to be performed with the "tweaked" nodes either by encapsulating calls referring to tweaked nodes pre-execution or by intercepting function calls referring to the tweaked nodes at runtime, allowing useful output to be generated at runtime without actually creating new objects or modifying existing objects in memory.

Figure 1:
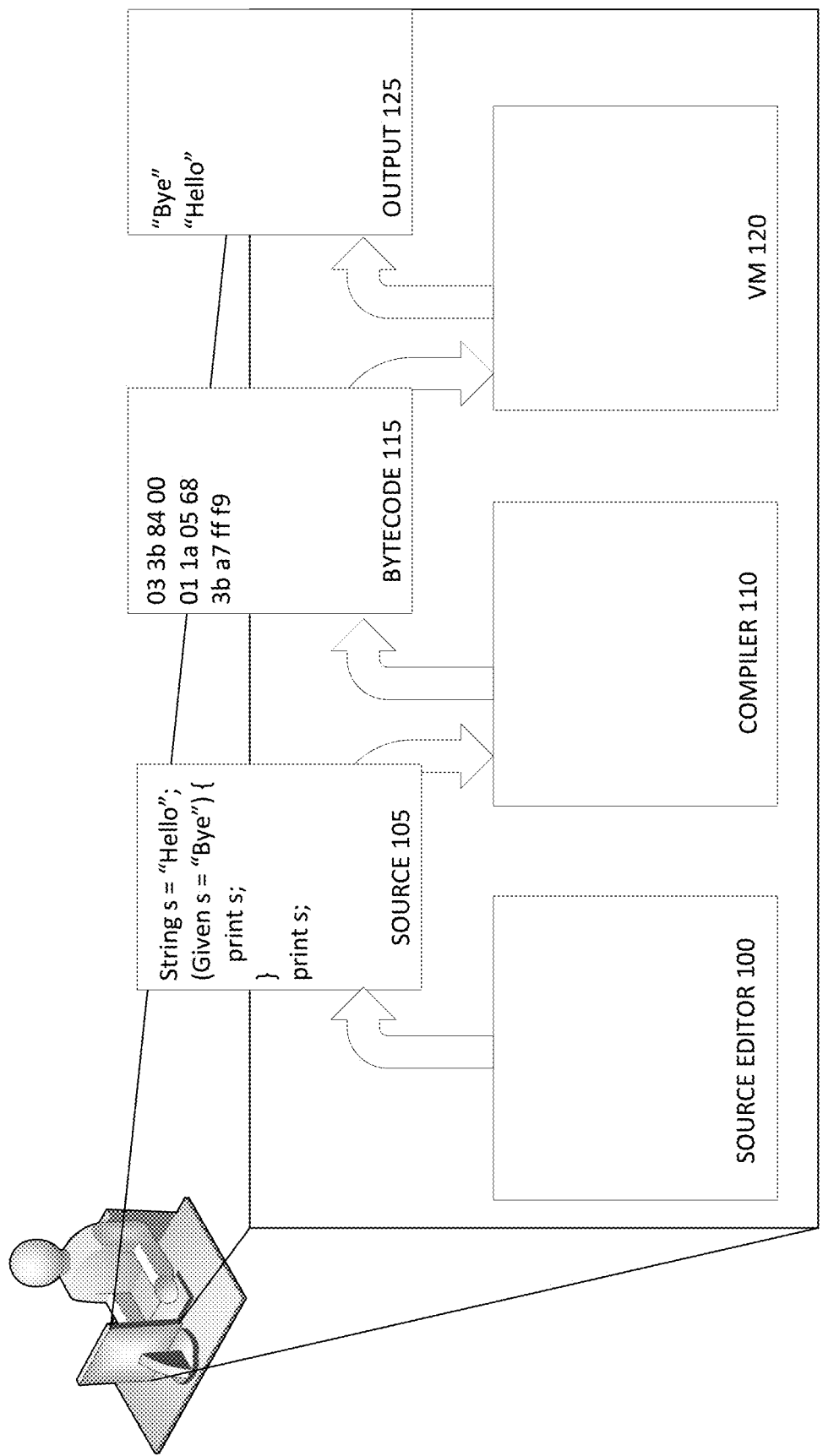
FIG. 1 depicts a code development and execution system according to methods disclosed herein.

FIG. 1 depicts an example code development and execution system according to methods disclosed herein.

A source code editor 100 or other graphical user interface for text entry may be used by a software developer to enter a source code file 105 into memory, comprising at least one simulated change to a software node (shown here as a "given" code block affecting the String s). The source code file 105 may then be input into compiler 110, generating a bytecode file 115. Finally, the bytecode file 115 may be distributed to any number of interpreters/virtual machines (VMs) 120, on the same machine or different machines, remote or local, which execute the bytecode file 115 and generate possible output 125.

In some embodiments, each of the source code editor 100, compiler 110 and VM 120 may all reside on a single computer under the control of the developer, or even all be managed by a single application, known as an integrated development environment (IDE). In other embodiments, the components may be divided between multiple computers; for example, a developer could write code in source code editor 100, upload the code to an online repository, where a scheduled process or script may cause a compiler 110 to compile the code into a daily build, and the daily build may be downloaded onto a third computer for execution by a VM on a computer operated by a software quality assurance tester or end user.

Different VMs 120 may exist for a variety of chip architectures or other operating environments, as described previously, while the output bytecode file 115 may be the same in each instance, relying on the VM 120 to accurately transform the commands of the bytecode file into the proper commands to set data values in the memory of the computing device executing the VM 120. In other embodiments, the use of a VM may be eschewed entirely and the compiler 110 always used to generate instructions to be directly performed by a computing device's processor without an interpretation level.

In various embodiments, one or more of source code editor 100, compiler 110, or VM 120 may be modified from a standard behavior to enable methods described herein, either through custom-coding the functionality as a completely new version of one of the above products, or by having an architecture that allows for installation of plugins or other end user modifications, so that functionality can be easily added to one or more of these three pieces of software by a software developer or end user who wishes to take advantage of it.

Although the below example describes development and execution according to a traditional compiled language, aspects of alternative embodiments could be equally well implemented in a dynamic or scripted programming language lacking a compiler entirely, either by modifying the instructions at the time of writing to allow a simulated change, modifying the instructions in a post-writing, pre-execution processing, or by modifying the software executing the instructions to be cognizant of the presence of possible simulated changes in the instructions.

Figure 2A:
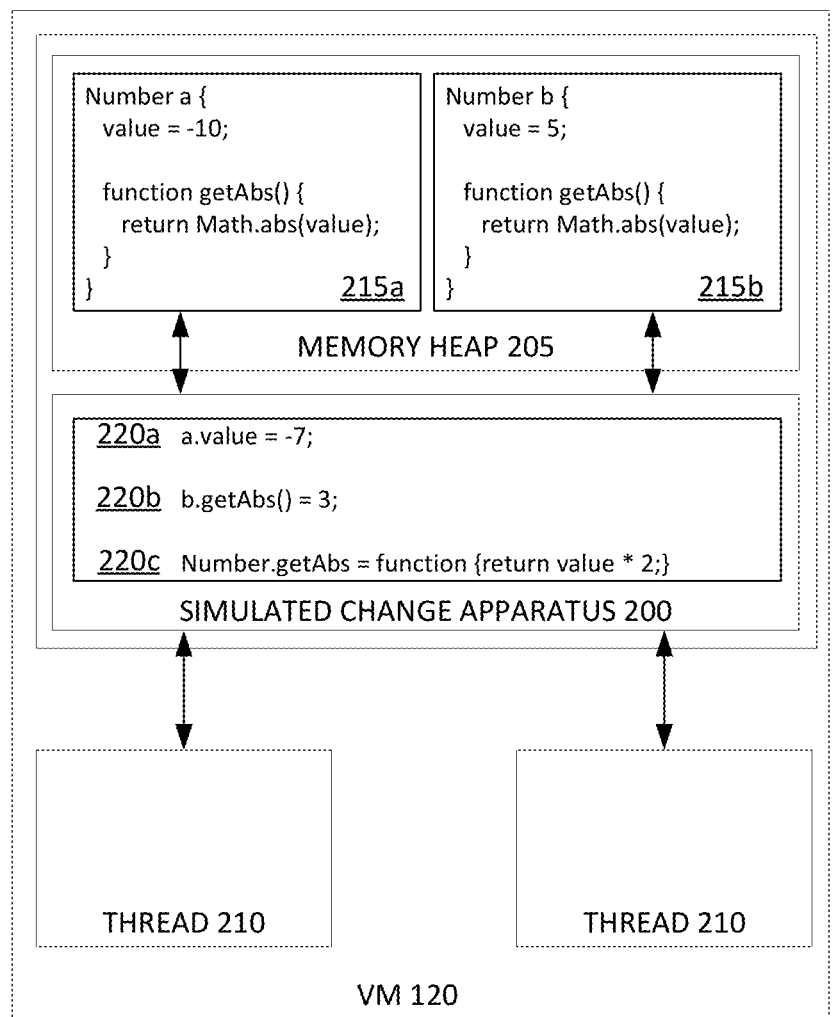
FIG. 2A depicts data structures suitable for use in executing code according to methods disclosed herein.

FIG. 2A depicts interactions between data structures suitable for use in executing code according to methods disclosed herein.

During execution of code in VM 120, a simulated change apparatus 200 is created to store a number of simulated changes or tweaks 220a-n that may be in effect at a given moment. A remainder of the memory heap 205 (or other memory, such as memory on disk or remotely accessed via a network/cloud architecture) is used to store actual objects or variables 215a-n, instantiated by executing code, which are guaranteed to be logically immutable (i.e., once a node is created, or the outcome of a function called, it can be guaranteed that subsequent references to the node or calls of the function will always return the same value). In some embodiments, logical immutability will be guaranteed by also maintaining physical immutability, that the values stored in memory have not been changed, because the simulated change apparatus 200 has intercepted and prevented completion of any attempt to change the immutable nodes. In other embodiments, the simulated change apparatus 200 may itself change one or more nodes (for example, for performance advantage reasons, when an actual change to a node would cause creation of fewer new objects or fewer function calls than a simulated change would create within the simulated change apparatus 200), and the simulated change apparatus 200 may maintain logical immutability by intercepting references or function calls and responding to them as if the logically immutable node had not changed, even though the node has been physically changed in memory.

The VM 120 generates one or more threads 210, each of which may be operated independently and asynchronously by processors of the computing device executing VM 120, and each of which may access the simulated change apparatus 200 and the heap 205.

However, the threads 210 may be conditionally prevented from directly accessing heap 205 through enforcement via the simulated change apparatus 200, via VM 120 itself redirecting references, or via other changes in the code being executed such that a reference to a variable, object, or other node 215 having its address in heap 205 is instead directed to an address in the simulated change apparatus 200 that represents the tweaked version 220 of the node.

Thus, for example, as depicted in FIG. 1, a first String s may be instantiated in the heap 205 with the value "Hello", while a second String s is instantiated in simulated change apparatus 200 with the value "Goodbye". When a thread 210 attempts to execute a line printing Strings, instead of being permitted to directly access the location in memory, the thread instead is permitted to retrieve the tweaked variable s from simulated change apparatus 200 and operate upon it.

In another example, as depicted in FIG. 2, a developer might create a simple object type to store a number, and to return the absolute value of that number when requested. If the developer creates a first Number a, with value −10, and a second Number b, with value 5, the Number objects are stored normally (215a and 215b respectively).

The developer might then create a number of simulated changes. In a first simulated change 220a, he might explicitly set the value of a to −7 instead of −10. In the second simulated change 220b, he might declare that the output of b's getAbs function is 3. Finally, in third simulated change 220c, he might declare that the Number class itself has redefined the getAbs function to instead double the value. These changes are stored in the simulated change apparatus 200.

As a result, when the threads 210 attempt to perform calculations on objects 215*a* and 215*b*, the simulated change apparatus 200 will short-circuit attempts to access data directly.

If a thread attempts, after only simulated change 220*a*, to print out a's value, it will be permitted only to see the value stored by change 220*a*, and print out −7 instead of −10. If the thread attempts to print out a.getAbs( ), it will be permitted to access the unchanged function that requires the use of a's value, but then it will still be forced to use the modified value stored in change 220*a*, so that positive 7 is printed out instead of positive 10.

If a thread attempts, after only simulated change 220*b*, to print out b.getAbs( ), it will be permitted only to see the value stored by change 220*b*, and print out 3, notwithstanding the existence of the function and the stored value. In some embodiments, if it attempts to print out b's value, it may print out 5, as there is no simulated change that formally defines a change to b's value, only to behavior of the getAbs function. In other embodiments, as described further below, a developer may be able to specify a method for back-propagating a first simulated change into a second simulated change to maintain logical consistency—in this case, setting b's value to either 3 or −3.

If a thread attempts, after only simulated change 220*c*, to print out a.getAbs( ) or b.getAbs( ), it would be permitted to see the redefinition of the function in simulated change 220*c*, and thereafter to directly or indirectly access the values of objects 215*a* and 215*b* to print out −20 and 10 respectively. If simulated change 220*c* were in effect at a same time as either simulated change 220*a* or 220*b*, rules of precedence or other configuration may be established to determine whether a.getAbs( ) should return a doubling of the simulated value −7 or the true value −10, and whether b.getAbs( ) should return a doubling of the value 5, or the explicitly cached value of 3 that is independent from the functional definition.

Figure 2B:
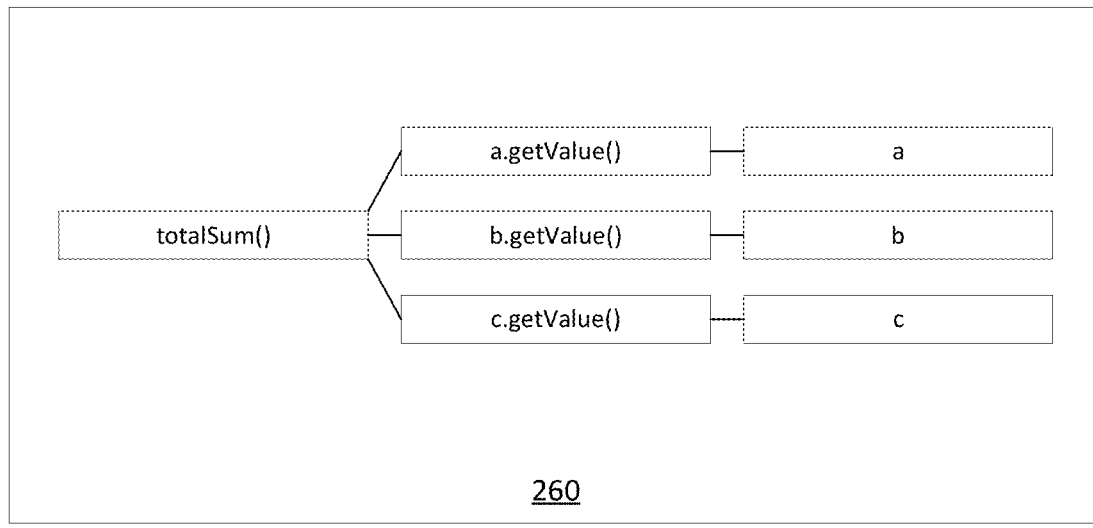
FIG. 2B depicts alternative data structures for storing and/or propagating simulated change throughout a distributed system.

FIG. 2B depicts alternative data structures for storing and/or propagating simulated change throughout a distributed system.

In some embodiments, as with simulated changes 220*a-c* from FIG. 2A, each simulated change may be stored as a completely independent "memo" of a change to a particular node, so that a simulated change apparatus 200 need only have the equivalent of a data structure 250 with two columns; nodes 250*a* and cached values 250*b* of those nodes.

In other embodiments, a data structure 255 may store simulated changes of values 255*b* to nodes 250*a* in conjunction with various dependencies 255*c* of each of those nodes. For example, if a function totalSum( ) were defined to call getValue( ) on a set of three objects and add those values together, a series of entries would record that totalSum depends on each of the getValues, which in turn each depend on the object nodes. In some embodiments, a single table (or set of dependencies) might be stored in data structure 255, as depicted in FIG. 2B. In other embodiments, two tables might be used, so that one table stores relationships with the indexed key of the dependency being the parent node, while the other table's indexed key is the child node, allowing for query efficiency in traversing dependency chains in either direction. In yet other embodiments, a standard Map<T>, List<T>, or other default data structure may be used to provide the functionality of data structure 255.

Data structure 255 could be used to quickly propagate a simulated change in an independent node forward through all its logical dependencies in a currently-running system and maintain logical consistency even in cached values. For example, if the object a were to undergo a simulated change to have a value of 11, the data structure could be searched and the simulated change apparatus 200 could automatically determine that the cached value of a.getValue( ) needs to similarly have a simulated change, and iteratively, that totalSum( ) needs a simulated change to return 31 instead of 30. In other embodiments, simulated changes may be propagated in the other direction, such that a simulated change in a dependent node triggers a search by the simulated change apparatus 200 for code that defines how a simulated change in the dependent node should trigger a simulated change, if any, in nodes from which it depends. Change propagation in either direction may be configured to be automatic, or alternatively, to flag a cached value as possibly outdated, but not to actually reset or recalculate the cached value unless referenced, possibly leading to a performance improvement by avoiding calculations.

Data structure 255 could be conceptually visualized as (or used to generate, within a graphical user interface during code analysis or debugging) an equivalent dependency tree 260 that demonstrates the logical connections between nodes that are currently undergoing or may at another point during runtime undergo a simulated change, and show an observer how a change to one node will affect other nodes within a system, allowing developers or other observers to examine any assumptions he may have about the interdependency of nodes or the computational cost of simulating change on a particular node.

In some embodiments, multiple computing devices may be used to simultaneously execute code undergoing simulated change. Data structures 250 or 255 may be maintained on each of the computing devices and may be shared between them to ensure that the same simulated changes are in effect on each device. If sharing of data structures occurs, the synchronization might occur at a specified interval (such as once per second) or be triggered by an event, such that the act of adding a new simulated change to one data structure triggers a push notification to other distributed data structures about the existence of the new simulated change.

The functionality described above for causing simulated changes to be stored (in whatever format) in the simulated change apparatus 200 during execution of code can be accomplished via one or more of several methods of modified behavior at runtime or pre-processing before runtime:

First, compiler 110 may be modified to recognize code for a "given" statement (variously called throughout this disclosure a simulated change, a tweak, or a scenario) and generate bytecode that delineates the existence of the given statement. Then, VM 120 may be modified itself to recognize these additional bytecode instructions and, during the duration of a simulated change, execute the bytecode injected or rewritten by the compiler to cause simulated change to occur. For example, the end result may be that a command to change a node is treated as a command to create a new node in the simulated change apparatus 200, or by replacing one memory address to access with another at runtime according to a lookup table. The VM 120 tracks that a given variable reference may refer to both an immutable node and a simulated changed node, and decides, based on whether the simulated change has ended, the location from which to retrieve a referenced value or other node.

Second, compiler 110 may be modified without any corresponding modifications of the VM 120. In this embodiment, compiler 110 may analyze the source code to determine the existence of a node that is being affected by a simulated change in a given statement, and then add additional instructions to generate the simulated change apparatus 200 and store the change to the node in the structure, rather than compiling to create code that actually changes the tweaked object. References to tweaked nodes may thus be encapsulated and redirected in the resulting code, so that the compiled code does not actually contain an instruction to change an existing assigned value in memory, and instead contains an instruction to assign to a second location in memory and retrieve therefrom.

Third, a source code editor 100 (or other graphical user interface, such as a terminal window, text editor, text field of a website, etc.) may be modified without any modifications of the compiler 110 or VM 120. In this embodiment, text recognition and replacement may be performed as code is written or when it is saved to disk, pre-compilation, noting where a simulated change occurs and modifying the source code of the simulated change itself. For example, the source code shown in FIG. 1—String s="Hello"; (Given s="Bye") {print s;}print s; —may be replaced in the source code text itself as—String s="Hello"; String t="Bye"; print t; print s—and thereby ensure that the reference s is not changed at runtime, even by a compiler or VM that was unaware of the simulated change intended by the programmer. While this textual example is quite simple, complex regular expressions could be used to recognize patterns in very complex code and rewrite to preserve immutability while still producing an output the developer would expect from reviewing the source code in a pre-processed state.

Fourth, in conjunction with or independent of any of the tools used above, functional features or "hooks" of various programming languages may be used to accomplish simulated change functionality without modifying executable code or an executing apparatus directly. For example, a dynamic language may allow a developer to write code that will cause certain function calls to be intercepted or modified before execution, allowing caching of a node or function output and redirection of a reference or function call to the cache.

As mentioned above, any of the three modified software development or execution tools described above may be created through custom programming of the necessary modifications, or may be able to use a plugin architecture to install a plugin that modifies existing behavior to accomplish the changes described. Further, if two or even three of the tools are grouped into a single integrated development environment, the software developer may be able to select among multiple options in the IDE's interface for ensuring that simulated change occurs at runtime—for example, accomplishing it via the VM during a testing phase, but then, when software is ready for final distribution, accomplishing it via a changed compiling process so that it will work regardless of whether the VM operated on an end user's computer has been modified to allow the simulated change.

In general, a system implemented according to the above methods can be used to allow a software developer to create variables, functions, objects, or other nodes that am absolutely immutable with respect to their initial state and with respect to a set of any simulated changes. This constraint is honored by the code execution system and reduces necessary assumptions and complexity by having referentially transparent nodes—nodes whose value or outcome is the same regardless of order of execution or program state, and which can thus be cached at any time for efficiency purposes and the cache trusted not to expire due to later mutation during runtime.

For example, a developer might create an object for storing a sale of an asset as follows:
@stored @entity Sale(
@node(tweak=true) val qty: Int,
@node(tweak=true) val price: int) {
@node(tweak=false) def value=qty*price}

In this example, qty and price are each set to be tweakable, to the simulated change apparatus may be prepared to recognize and cache a simulated change to either value. value is set to be untweakable, as value is completely dependent on the quantity and price, and so tweaking either quantity or price and the value independently would lead to a logical inconsistency. In examples described further below, methods may be used to define behavior to ensure logical consistency even when tweaking one node that is only dependent on other nodes. Further, compilers or executing apparatuses of code may be able to make additional optimizations if they are permitted to make the (correct) assumption that a particular node will not change, and to rely on that assumption in transforming source code to machine instructions or performing additional caching to prevent unnecessary code execution.

Given statements may be expressed in a series of instructions that contains one or more statements for execution and at least begins with a requested simulated change. Further, given statements may overlap, so that a second simulated change is described while a first simulated change is already in effect. Overlapping given statements may be accomplished in some embodiments by strict nesting of one statement within another, in the same way that "if" statements typically follow a condition with a bracketed section of instructions that is fully resolved before leaving the bracketed section. Alternatively, given statements may only partially overlap with start and end points such that commands may be sequentially provided to request a first simulated change, request a second simulated change, request end of the first simulated change, and request end of the second simulated change, such that there are instructions for which both changes are in effect as well as those for which only one simulated change or the other is in effect. At the conclusion of the given statement, the simulated change ends, and any further code statements referencing a tweaked node will return the original, unchanged value, without the developer needing to reset or reverse the tweaking of the node.

In some embodiments, every node may be tweakable by a given statement, though in a preferred embodiment, the developer may explicitly declare each node to be tweakable or untweakable.

In a preferred embodiment, tweaks may be expressed in the form "<Tweak Target> <Tweak Operator> <Tweak Value>". For example, a tweak of "given(car.price:=25.0)" may set the car object's price member explicitly to 25 within the simulated change apparatus, so that all code within the given block that attempts to refers directly or indirectly to that member will instead be directed to the simulated change apparatus and return 25 without fail. A tweak of "given (car.price:+=25.0)" may instead cause storage within the simulated change apparatus of a value that has been increased by 25 from the immutable price, and all code within the given block will only be able to reference the increased value stored by the simulated change apparatus. However, in both cases, the original car object remains completely unchanged, both by the simulated change apparatus, which only caches the node and intercepts requests for the original node, and by the rest of the code, which is not permitted to change the immutable node and is only permitted to look up a cached value or potentially request that further caching occur via additional given statements or tweaks.

In some embodiments, a simulated change request may be permitted to tweak a reference to a class itself, affecting every object instantiated from that class in the same way, or to tweak a method or variable of a class itself, affecting the method or variable of every object instantiated from the class, rather than only acting on the node that is a single object or a member associated with a single object. For example, in software that generates representations of a number of cars in traffic and in which a developer wishes to simulate a change in the overall speed of the cars, a given statement may apply to the Car object itself as a tweak instead of requiring the developer to loop through every instantiated car and tweak its speed individually.

When a node is declared as tweakable, it may be thought of logically as a "dependent" node and the developer may be able to specify how a tweak to the "dependent" node should actually be treated as a tweak to a different, "independent" node.

For example, in an engineering application, a software object may represent a support beam inside a physical structure that has a certain width, and a certain resultant physical tolerance for stress. The object may also be configured to store a certain margin of error for safety that should be enforced on all such beams. If the developer wishes to simulate a certain stress on a building, he may create a given statement that explicitly sets the stress on the beam with a tweak, and then outputs a minimum necessary beam width to support the stress within the margin. Under these circumstances, it is highly likely that the developer will wish for the margin of error for safety to remain unchanged during all simulated change, and not to output a beam width that would tolerate the stress with a lower margin of error. The developer, when declaring the stress node to be tweakable at development, would add statements that clarify how to calculate a tweaked beam width at runtime based on a tweaked stress, into which the assumption that margin of error should never change can be enforced.

In another example, a software object representing a stock portfolio may contain a number of nodes for values of assets or other securities, as well as a total portfolio value. If the developer wishes to simulate performance of the portfolio under the assumption that it has a different overall starting value, he may need to specify rules for how the dependent value (total value) is used to derive the one or more independent values (the values of additional assets) that need to maintain logical consistence with the dependent value. The developer might, in this example, specify that a tweak to overall value of a given proportion should be applied in the same proportion to each of the assets, so that the final sum of value is consistent with the values of each of its parts. Alternatively, other rules might be defined that allow for greater control and complexity of the relationship, such as specifying that all increases should be applied to a certain asset type, or prioritizing an order in which decreases are applied to asset types sequentially until they are completely depleted.

In another example, a software object representing an event may have a starting time, ending time, and resultant duration. The developer may desire the behavior that logical consistency be maintained between these values by treating a simulated change to duration as changing the ending time to the appropriate value and leaving the starting time always unchanged. In a Scala example, the event node may then be represented as:

```
import javax.time.Duration
import javax.time.Instant
@entity class Meeting(val title: String, val start: Instant,
@node(tweak=true) val end: Instant) {
    @node(tweak=true)  def  duration=Duration.between
        (start, end)
    def  duration_:=(newDuration:  Duration)=Tweaks.by-
        Value(end:=start plus newDuration)
    override    def    toString=s"$title:    $start->$end
        [${duration.toSeconds}s]"
}
```

In the above example, the start value remains untweakable as a default setting, while end and duration are tweakable, and the method is specified for how a tweak to duration is converted at runtime into a logically-equivalent tweak to end that can be used in addition or even instead of a stored tweak to duration.

Figure 3:
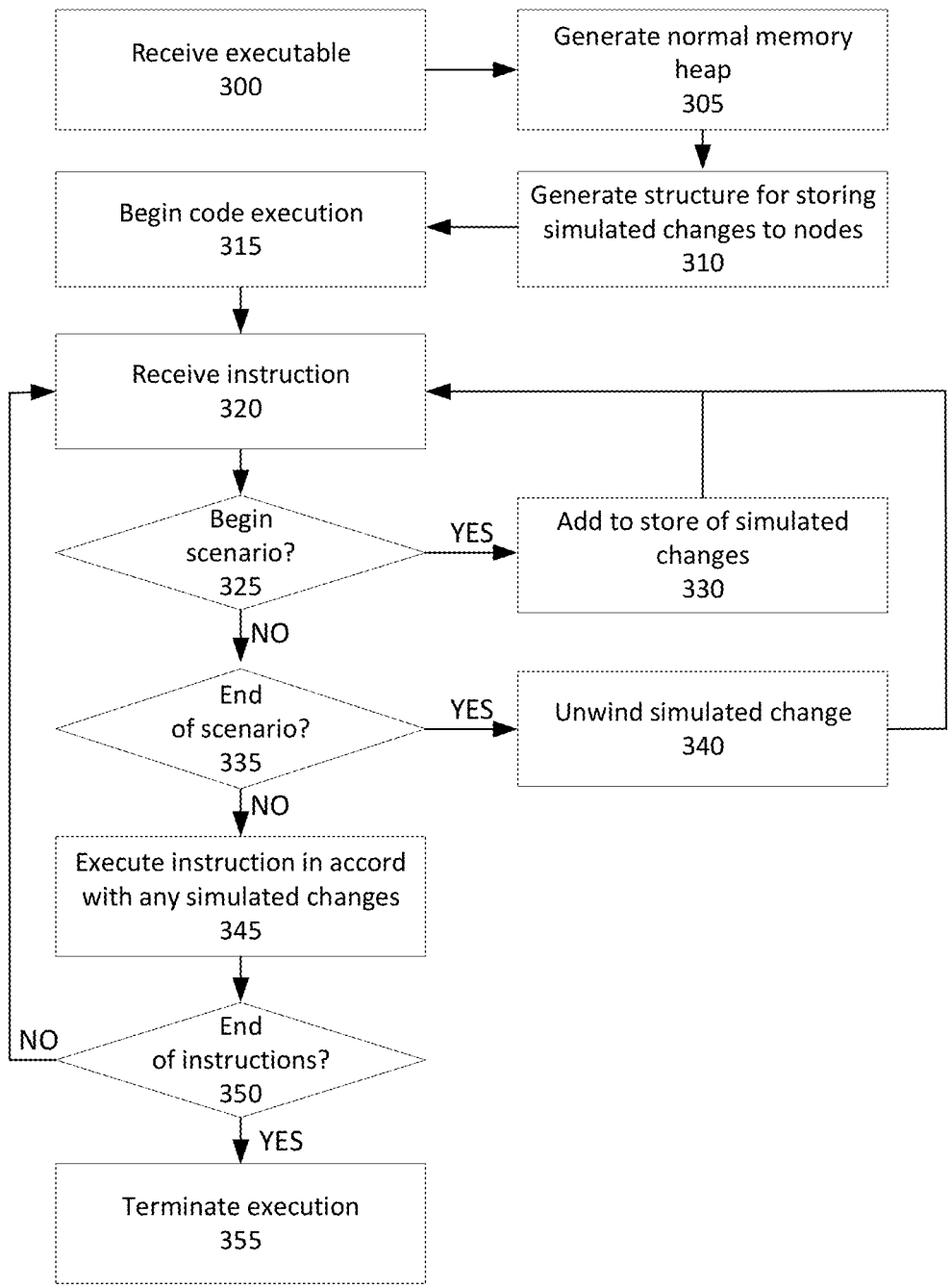
FIG. 3 depicts a method of simulating change in one or more immutable nodes during runtime execution.

FIG. 3 depicts a logical method of simulating change in one or more immutable nodes during runtime execution.

Initially, when called by the operating system, terminal, etc., a VM 120 or other software for executing code receives or retrieves a series of instructions (Step 300) to begin execution, instruction by instruction or line-by-line as appropriate for the language in which the code is written or compiled. The source of the instructions may be a file on disk, received as a network stream, input by a user in an interactive terminal, stored in short-term memory as a dynamic linked library, or from any other repository in which instructions may be entered and/or stored.

As part of normal initialization, memory may be set aside in the heap to store the various immutable objects that may be generated during runtime (Step 305). The use of short-term memory to store runtime objects is the most common embodiment, but alternatively the objects may be serialized and stored on a hard disk, on a remote networked device, or in any other logical or physical location.

Next, the simulated change apparatus is generated for storing tweaked variables, objects, and functions (Step 310).

After initialization, execution of code begins (Step 315), including reading in a first instruction from the stream of instructions (Step 320).

The executing VM or other apparatus determines whether the instruction represents a simulated change request or other command to begin operating under a scenario simulating change (Step 325). If a particular line or instruction is, the executing apparatus will store the new simulated change in the simulated change apparatus 200 (Step 330), as well as, in some embodiments, ensuring that the simulated change is propagated to any other remote executing apparatuses that may be acting in concert with this executing apparatus, and/or propagating any simulated changes upstream or downstream through a tree of dependencies to maintain logical consistency among all nodes and cached values.

After storing, propagating, and calculating all simulated changes, the executing apparatus continues to read in additional instructions (back to Step 320).

If a given instruction is not a command to begin a scenario, the executing apparatus also determines whether it is a command to end a scenario (Step 335). If so, stored simulated changes associated with the ended scenario may be unwound (Step 340), by deletion from the simulated change apparatus 200, denoting the simulated changes as inactive or dormant without deleting them, or otherwise stopping them from being considered during future instruction execution unless explicitly re-created or re-enabled.

If a given line or instruction is neither a command to begin nor end a scenario, it is performed under the normal rules of the execution for the language/system (Step 345) with the exception that the simulated change apparatus is used to execute code as if any simulated changes in effect are currently affecting the value of immutable nodes. Whenever an instruction refers to a value, object, or other node that was tweaked, the cached value is retrieved from the simulated change apparatus 200 instead of from the originally stored, immutable node.

If the end of the stream or instructions (or file to be executed, etc.) has been reached (Step 350), the executing system will terminate execution (Step 355) and end the entire method; otherwise, the executing system will read in another line or instruction and begin the execution loop again (back to Step 320).

Figure 4:
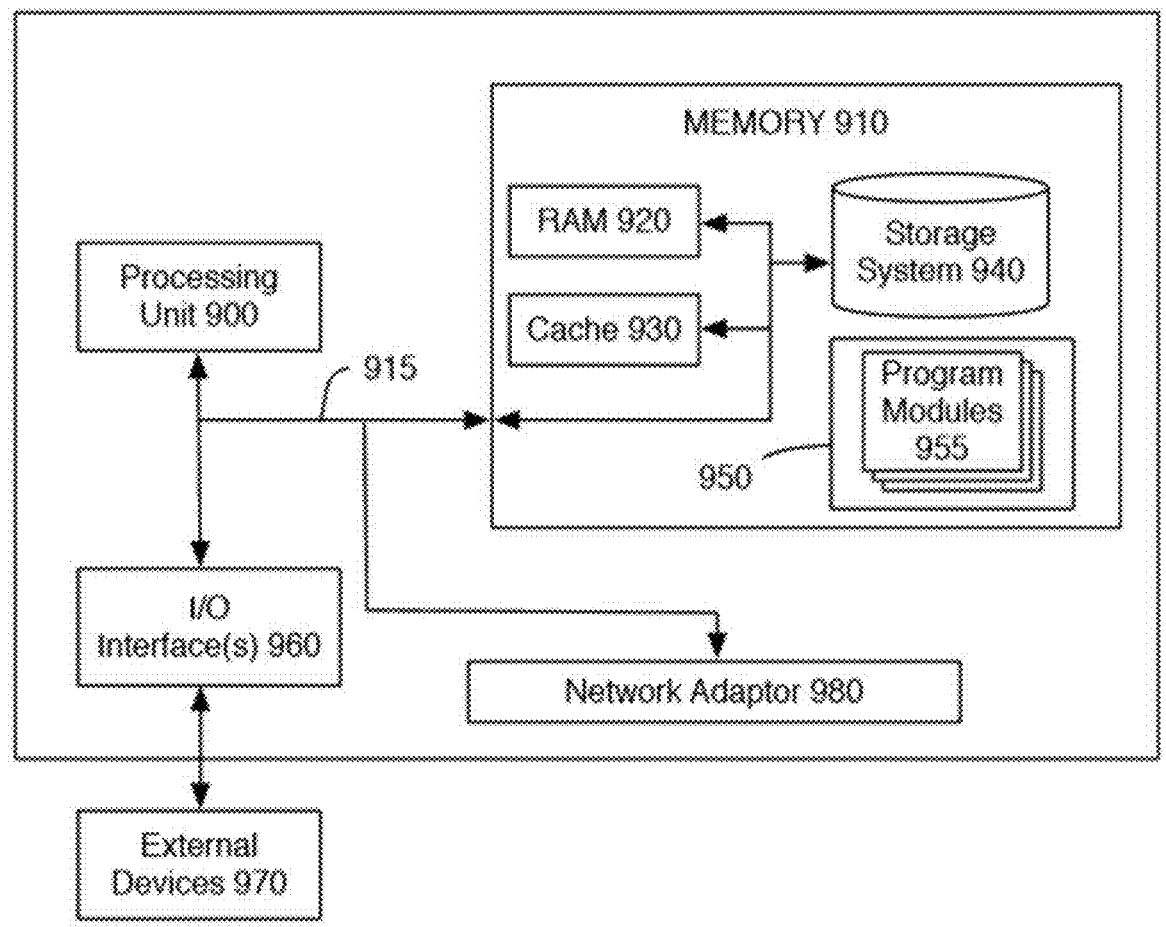
FIG. 4 is a high-level block diagram of a representative computing device that may be utilized to implement various features and processes described herein.

FIG. 4 is a high-level block diagram of a representative computing device that may be utilized to implement various features and processes described herein, including, for example, for executing any of source code editor 100, compiler 110, or VM 120. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 4, the computing device is illustrated in the form of a special purpose computer system. The components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C, C++, Java™, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A system for executing software, comprising:
a computing device comprising at least one processor and non-transitory memory storing instructions for a code execution module such that, when the instructions are executed by the at least one processor, the at least one processor will:
receive software for execution by the code execution module;
recognize that one or more immutable and referentially transparent software nodes are denoted as immutable and referentially transparent by the software;
execute a first portion of the software with values assigned to the one or more immutable and referentially transparent software nodes;
determine that the software comprises an instruction to begin a simulated change of the one or more immutable and referentially transparent software nodes during runtime while retaining logical immutability of the one or more immutable and referentially transparent software nodes;

cache a value or output of the simulated change to the one or more immutable and referentially transparent software nodes;
store the simulated change to the one or more immutable and referentially transparent software nodes in a simulated change apparatus;
using the simulated change apparatus, perform one or more operations of a second portion of the software as if the one or more immutable and referentially transparent software nodes had been changed in the non-transitory memory, while the one or more immutable and referentially transparent software nodes actually remain unchanged, the one or more operations including an operation that relies on the one or more immutable and referentially transparent software nodes, such that the cached value or output is retrieved and used instead of recalculating the value or output; and
output results of the one or more operations.

2. The system of claim 1, wherein the instructions include instructions for a virtual machine that has been modified to create the simulated change apparatus and to monitor the software at runtime for an instruction to begin the simulated change.

3. The system of claim 2, wherein the virtual machine, in response to determining existence of a reference in the software to an immutable and referentially transparent software node of the one or more immutable and referentially transparent software nodes, automatically redirects the reference to the simulated change apparatus to return from the simulated change apparatus a value different from a value of the immutable and referentially transparent software node.

4. The system of claim 1, wherein the software is generated via a compiler that adds instructions for generating the simulated change apparatus to source code of the software and that encapsulates existing instructions of source code of the software to begin a simulated change with additional instructions to redirect references to the one or more immutable and referentially transparent software nodes to the simulated change apparatus.

5. The system of claim 4, wherein the compiler has been modified by a software plugin in order to cause the compiler to add instructions to and encapsulate instructions of the source code of the software.

6. The system of claim 1, wherein source code of the software is created by a human user via a graphical user interface (GUI), and wherein, prior to compilation of the source code, the GUI adds instructions for generating the simulated change apparatus to the source code and encapsulates existing instructions to begin a simulated change with additional instructions to redirect references to the one or more immutable and referentially transparent software nodes to the simulated change apparatus.

7. The system of claim 6, wherein the GUI has been modified by a software plugin to cause the GUI to automatically add instructions to and encapsulate instructions of the source code.

8. The system of claim 1, wherein the software comprise both an instruction to begin a second simulated change to one or more different immutable and referentially transparent software nodes while a first simulated change is in effect, and an instruction to end the second simulated change without ending effect of the first simulated change, such that the simulated change apparatus is used to automatically perform the one or more operations of the software instructions as if both the one or more immutable and referentially transparent software nodes and the one or more different immutable and referentially transparent software nodes had been changed in the non-transitory memory.

9. The system of claim 1, wherein the simulated change apparatus stores the simulated change as a set of one or more memos, each memo comprising an identifier of an immutable and referentially transparent software node and a cached value for that immutable and referentially transparent software node.

10. The system of claim 1, wherein the simulated change apparatus stores the simulated change as a set of one or more dependencies, each dependency comprising an identifier of a first node, an identifier of a second node in a logical dependency relationship with the first node such that the value of the first node cannot be calculated or ascertained without knowing the value of the second node, and a cached value for the first node.

11. A computer-implemented method of simulating change of immutable elements during runtime of a software executable, comprising:
receiving a series of software instructions;
automatically recognizing that one or more immutable and referentially transparent software nodes are denoted as immutable and referentially transparent by the software instructions;
executing a first portion of the software instructions with values assigned to the one or more immutable and referentially transparent software nodes
automatically determining that the software instructions comprise an instruction to begin a simulated change of the one or more immutable and referentially transparent software nodes during runtime while retaining logical immutability of the one or more immutable and referentially transparent software nodes;
caching a value or output of the simulated change to the one or more immutable and referentially transparent software nodes;
storing the simulated change to the one or more immutable and referentially transparent software nodes in a simulated change apparatus;
using the simulated change apparatus, automatically performing one or more operations of a second portion of the software instructions as if the one or more immutable and referentially transparent software nodes had been changed in the non-transitory memory, while the one or more immutable software and referentially transparent nodes actually remain unchanged, the one or more operations including an operation that relies on the one or more immutable and referentially transparent software nodes, such that the cached value or output is retrieved and used instead of recalculating the value or output; and
outputting results of the one or more operations.

12. The method of claim 11, wherein a virtual machine is used to automatically perform the one or more operations, and further comprising:
modifying the virtual machine to create the simulated change apparatus and to monitor the software instructions at runtime for the instruction to begin the simulated change.

13. The method of claim 12, further comprising:
wherein the virtual machine, in response to determining existence of a reference in the software to an immutable and referentially transparent software node of the one or more immutable and referentially transparent software nodes, automatically redirects the reference to the simulated change apparatus to return from the simulated change apparatus a value different from a value of the immutable and referentially transparent software node.

14. The method of claim 11, wherein the software instructions are generated via a compiler and further comprising:
   automatically adding instructions for generating the simulated change apparatus to source code of the software instructions; and
   encapsulating existing instructions of source code of the software instructions to begin a simulated change with additional instructions to redirect references to the one or more immutable and referentially transparent software nodes to the simulated change apparatus.

15. The method of claim 14, further comprising:
   modifying the compiler via a software plugin in order to cause the compiler to add instructions to and encapsulate instructions of the source code of the software instructions.

16. The method of claim 11, wherein source code of the software instructions is created by a human user via a GUI, and further comprising:
   prior to compilation of the source code, automatically adding instructions for generating the simulated change apparatus to the source code; and
   automatically encapsulating existing instructions to begin a simulated change with additional instructions to redirect references to the one or more immutable and referentially transparent software nodes to the simulated change apparatus.

17. The method of claim 16, further comprising:
   modifying the GUI via a software plugin to cause the GUI to automatically add instructions to and encapsulate instructions of the source code.

18. The method of claim 11, wherein the software instructions comprise both an instruction to begin a second simulated change to one or more different immutable and referentially transparent software nodes while a first simulated change is in effect, and an instruction to end the second simulated change without ending effect of the first simulated change, such that the simulated change apparatus is used to automatically perform the one or more operations of the software instructions as if both the one or more immutable and referentially transparent software nodes and the one or more different immutable and referentially transparent software nodes had been changed in the non-transitory memory.

19. The method of claim 11, wherein the simulated change apparatus stores the simulated change as a set of one or more memos, each memo comprising an identifier of an immutable and referentially transparent software node, a description of a simulated change to the node, and a cached value for that immutable and referentially transparent software node.

20. The method of claim 11, wherein the simulated change apparatus stores the simulated change as a set of one or more dependencies, each dependency comprising an identifier of a first node, an identifier of a second node in a logical dependency relationship with the first node such that the value of the first node cannot be calculated or ascertained without knowing the value of the second node, and a cached value for the first node, and wherein the simulated change apparatus is used to determine a set of nodes affected by a simulated change to a given node.

\* \* \* \* \*